United States Patent
Filonov et al.

(10) Patent No.: US 11,611,572 B2
(45) Date of Patent: Mar. 21, 2023

(54) SYSTEM AND METHOD OF PROCESSING INFORMATION SECURITY EVENTS TO DETECT CYBERATTACKS

(71) Applicant: AO Kaspersky Lab, Moscow (RU)

(72) Inventors: Pavel V. Filonov, Moscow (RU); Sergey V. Soldatov, Moscow (RU); Daniil A. Udimov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 223 days.

(21) Appl. No.: 17/097,342

(22) Filed: Nov. 13, 2020

(65) Prior Publication Data

US 2021/0400058 A1  Dec. 23, 2021

(30) Foreign Application Priority Data

Jun. 19, 2020 (RU) ........................... RU2020120436

(51) Int. Cl.
*H04L 9/40* (2022.01)
*G06N 20/00* (2019.01)

(52) U.S. Cl.
CPC ......... *H04L 63/1416* (2013.01); *G06N 20/00* (2019.01); *H04L 63/1425* (2013.01)

(58) Field of Classification Search
CPC . H04L 63/1416; H04L 63/1425; H04L 63/00; H04L 63/14; H04L 63/1408; H04L 63/1433; H04L 63/1441; H04L 63/145; H04L 63/1466; H04L 63/1483; H04L 63/1491; G06N 20/00; G06N 3/08; G06N 5/003; G06F 21/00; G06F 21/50; G06F 21/55; G06F 21/552; G06F 21/554; G06F 21/56; G06F 21/561–566
See application file for complete search history.

(56) References Cited

U.S. PATENT DOCUMENTS

| | | | |
|---|---|---|---|
| 7,640,589 B1 * | 12/2009 | Mashevsky | G06F 21/56 726/25 |
| 8,776,241 B2 | 7/2014 | Zaitsev | |
| 8,839,349 B2 | 9/2014 | Pearcy et al. | |
| 2013/0086004 A1 * | 4/2013 | Chao | G06F 16/90344 707/E17.007 |
| 2017/0262633 A1 * | 9/2017 | Miserendino | G06F 21/564 |
| 2018/0234434 A1 * | 8/2018 | Viljoen | H04L 63/145 |

(Continued)

*Primary Examiner* — Ponnoreay Pich
*Assistant Examiner* — Mudasiru K Olaegbe
(74) *Attorney, Agent, or Firm* — ArentFox Schiff LLP; Michael Fainberg

(57) ABSTRACT

A method for processing information security events of a computer system includes receiving information related to a plurality of information security events occurred in the computer system. Each of the events includes an event related to a possible violation of information security of the computer system. A verdict is determined for each of the events. The verdict includes: i) information security incident or ii) false positive. The verdict is false positive if the probability of a false positive for the corresponding event is greater than a first threshold. Verdicts are changed for a subset of the events from the false positive to the information security incident. A number of events in the subset is lower than a second threshold. An analysis of the events having a verdict of the information security incident is performed to determine if the computer system is under a cyberattack.

20 Claims, 7 Drawing Sheets

(56) References Cited

U.S. PATENT DOCUMENTS

| | | | | |
|---|---|---|---|---|
| 2019/0064752 A1* | 2/2019 | Marwah | ................. | H04L 63/08 |
| 2019/0207967 A1* | 7/2019 | Vashisht | ............. | H04L 63/1425 |
| 2019/0340354 A1* | 11/2019 | Gamble | ............. | H04L 63/1425 |
| 2020/0401696 A1* | 12/2020 | Ringlein | ................ | G06N 20/00 |
| 2022/0014547 A1* | 1/2022 | Hasan | ................... | G06N 20/00 |
| 2022/0261480 A1* | 8/2022 | Youngberg | ........... | G06F 21/105 |

* cited by examiner

SYSTEM AND METHOD OF PROCESSING INFORMATION SECURITY EVENTS TO DETECT CYBERATTACKS

CROSS-REFERENCE TO RELATED APPLICATION

This application claims benefit of priority under 35 U.S.C. 119(a)-(d) to a Russian Application No. 2020120436 filed on Jun. 19, 2020, which is incorporated by reference herein.

FIELD OF TECHNOLOGY

The invention relates to the field of information security, and, more specifically, to method of processing information security events to detect cyberattacks.

BACKGROUND

At present, alongside traditional malicious software (such as viruses, Internet worms, keyloggers, encrypters, etc.), computer attacks (also known as cyberattacks) have become widespread. For example, such attacks may include directed attacks (also known as targeted attacks or TAs), and complex attacks (advanced persistent threats or APTs) against an information system. The information system includes the totality of computing devices and communications used to link them together. The information system is also known as a corporate infrastructure. Cyber criminals may have various goals ranging from simple theft of personal data to industrial espionage. Often, cyber criminals have information about the architectures of corporate networks, the principles of the internal document flow, the means used to protect the networks and the computer devices, or any other information which is specific to the information system and which is often hidden. Having this information allows the cyber criminals to get around the existing means of defense, which often do not possess flexibility in their settings to meet all the needs of the information system.

The existing technologies for defending against malicious software and computer threats, such as signature analysis, heuristic analysis, emulation, among many others, have a number of deficiencies. These deficiencies typically prevent such defensive technologies from providing the proper level of protection against directed attacks and other computer attacks. For example, conventional malware defense platforms are unable to detect and investigate previously unknown threats, computer attacks such as, complex attacks (using technologies to get around the defense platforms) and long-duration attacks (from several days to several years), the indicators of which become known a long time after the start of the attack.

Accordingly, more advanced systems are typically used to protect corporate networks against the mentioned threats, besides the conventional antivirus solutions and systems of detection and prevention of intrusions. Such more advanced systems include, but are not limited to Security Information and Event Management (SIEM) systems with integrated streams of data on threats, anti-APT systems for detecting of complex threats and directed attacks, and systems for finding out information about the characteristics of malicious software based on indicators of compromise. Besides automatic systems, analysis by information security (InfoSec) experts may be used as a defense mechanism. The automatic systems typically detect InfoSec incidents by correlating InfoSec events with data on known threats. In the majority of cases, the detected InfoSec incidents may require analysis by an InfoSec expert in order to minimize the harm, gather data about the incident, and the future mitigation steps to take. However, a large number of InfoSec incidents in existing systems are typically false positives. As a result, InfoSec experts often waste a lot of time on analyzing false incidents, which increases the likelihood of overlooking a genuine InfoSec incident. Moreover, the expenses for keeping a large number of qualified InfoSec experts on staff are continuously increasing.

Thus, there is a need to address the shortcomings of conventional cyberattack defense platforms in the processing of information security events into incidents and false positives.

SUMMARY

As one variant embodiment of the present invention, a method is proposed for processing information security events of a computer system, wherein the method involves steps in which: information related to a plurality of information security events occurred in the computer system is received. Each of the plurality of information security events includes an event related to a possible violation of information security of the computer system. A verdict is determined for each of the plurality of the received information security events. The verdict includes one of the following: i) information security incident or ii) false positive. The verdict is false positive if the probability of a false positive for the corresponding information security event is greater than a first threshold. Verdicts are changed for a subset of the plurality of information security events from the false positive to the information security incident. A number of information security events in the subset is lower than a second threshold. An analysis of the information security events having a verdict of the information security incident is performed to determine if the computer system is under a cyberattack.

In one aspect, receiving information related to the plurality of information security events further includes receiving one or more event security notifications related to an object of the computer system. The one or more event security notifications include a marker characterizing an event that occurred in the computer system and a timestamp indicating time interval during which corresponding information about the event was gathered.

In one aspect, a trained machine learning model determines the verdict based on at least one of the following: characteristics of the one or more event security notifications, one or more sources of the one or more event security notifications, characteristics of the one or more sources of the one or more event security notifications.

In one aspect, performing the analysis of the information security events further includes performing the analysis of the information security events having a lowest probability of a false positive.

In one aspect, the verdict includes one of: a fuzzy verdict, a tentative verdict, a final verdict.

In one aspect, the marker characterizing an event that occurred in the computer system includes at least one of the following: a checksum of at least a portion of the object, a source of a resource from which the object was embedded on the computer system, results of an emulation of the execution of the object, a log of calls of system functions from the object, time of appearance of the object on the computer system, data being transmitted by the object through a computer network.

In one aspect, determining the verdict further includes calculating fuzzy hash for a corresponding object and determining if the calculated hash corresponds to a known malicious object.

In one aspect, the method further includes determining the second threshold based on the results of the analysis performed on the first set of the information security events.

In one aspect, the method further includes modifying a training sample of the trained machine learning model based on the results of the analysis performed on the first set of information security events.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1A:
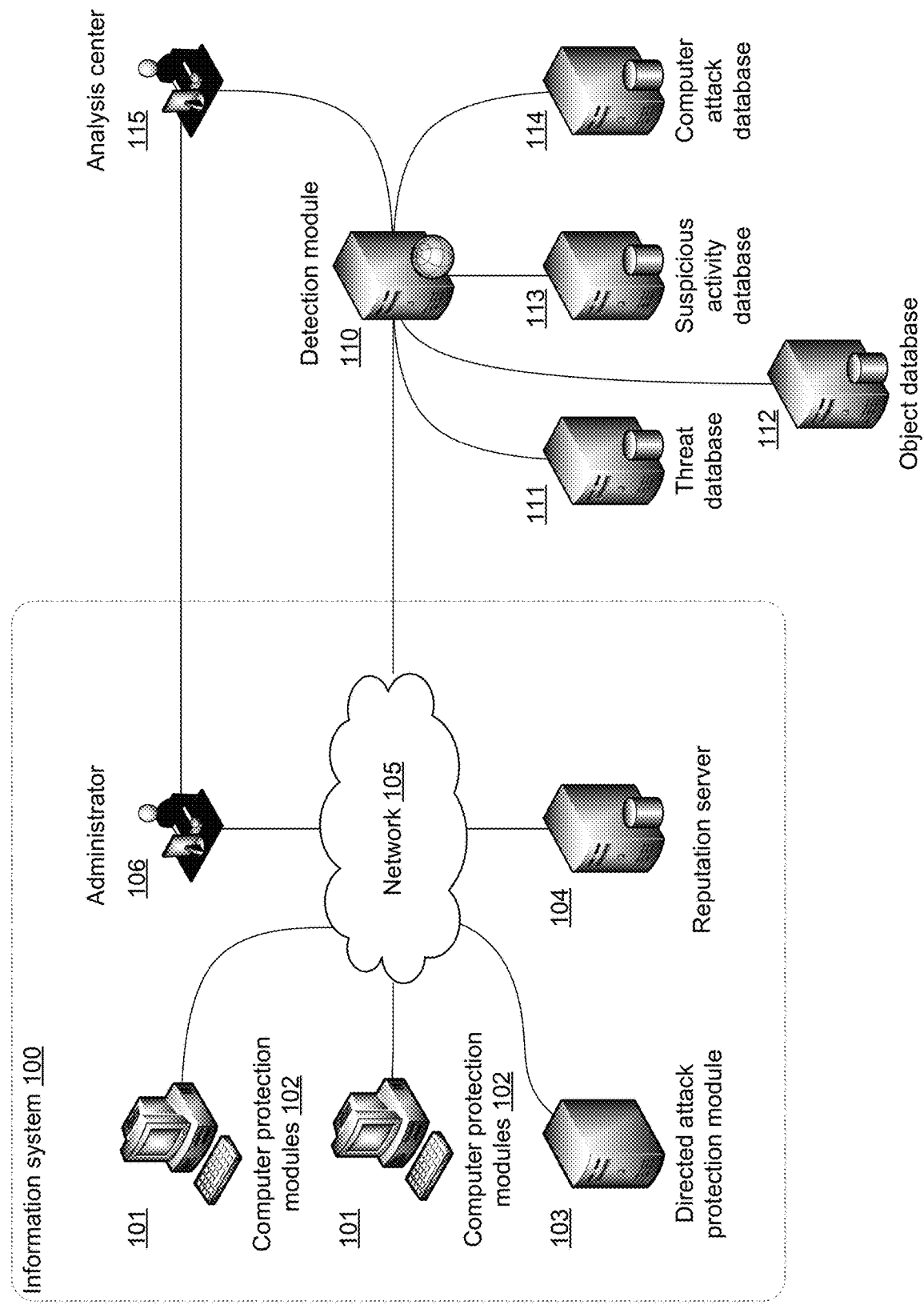
FIG. 1a shows a general block diagram of an exemplary computer attack detection system.

Exemplary aspects are described herein in the context of a system, method, and computer program product for processing of information security events to detect cyberattacks. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

A number of definitions and concepts that will be used in describing variant aspects of the present disclosure will now be introduced.

The term "Information security" (InfoSec) refers to a sphere of science and technology encompassing a group of problems involving the assurance of protection of objects in the information infrastructure under conditions of existence of computer threats. As used herein, the term "information security" may also mean the protection of information against unauthorized viewing, transformation, and destruction, and the protection of information resources against actions aimed at affecting their performance.

The term "InfoSec event" refers to any identified phenomenon in a system or network.

The term "InfoSec incident" refers to a violation or threat of violation of the InfoSec of an information system.

The term "InfoSec threat" refers to any potential event, action (influence), process or phenomenon creating a danger of occurrence of an InfoSec incident.

The term "vulnerability of an information system" refers to a shortcoming in an information system, which can be used by an outside cybercriminal to deliberately realize an InfoSec threat.

The term "exploit" refers to a computer program, a fragment of computer code or a sequence of commands utilizing vulnerabilities in software and used to conduct an attack on an information system.

The term "response to an InfoSec incident" refers to a structured set of actions directed at establishing the details of an incident, minimizing the harm from the incident, and preventing a repetition of the InfoSec incident.

The term "computer attack" refers to a group of clandestine and lengthy steps carried out by a cybercriminal and directed at the information system of an organization or a physical person in order to penetrate the network and inflict various kinds of harm on the organization or physical person.

The term "directed attack" (also referred to as a "targeted attack", TA) refers to a computer attack on a specific information system of an organization or a specific physical person in order to penetrate the network and inflict various kinds of harm on the organization or physical person.

The term "complex attack" (also referred to as "advanced persistent threat" or APT, or APT attack) refers to a complex, lengthy, well-planned and multipronged computer attack utilizing complex malicious software, social engineering methods, and data on the information system of the victim.

The term "life cycle of an attack" (also referred to as the "kill chain") refers to the sequence of steps implementing the attack.

The term "SIEM" (Security Information and Event Management) refers to a system enabling an analysis of IS events originating from network devices and applications in real time. One of the components of SIEM systems may be configured to match up events with streams of data about threats.

The term "streams of data about threats" (also referred to as "feeds") refers to information containing indicators of compromise and allowing the discovery of an instance of a compromise by using SIEM systems and other network devices and information protection means.

The term "indicators of compromise" (also referred to as "IoCs"), less often referred to as "indicators of infection", refers to artifacts or residual symptoms of an intrusion into an information system which are observable on a computer or in a network. Typical indicators of compromise may be, for example, triggered virus signatures, IP addresses from which malicious software has been downloaded, check sums of malicious and untrusted files, URL addresses of malicious and untrusted resources and domain names of command centers of botnets which have been observed in known computer attacks. A number of standards exist for indicators of compromise, such as, for example, OpenIoC, STIX and others.

The term "fuzzy hash" or "flexible convolution" refers to a file convolution which is formed such that a slight change in the file will not result in a change in the convolution. That is, upon detecting a malicious file with the aid of its convolution value, many similar (possibly unknown) malicious files will also be detected. The chief characteristic of such a convolution is its invariance to minor changes in the file.

The term "fuzzy verdict" refers to a response of a protection system (antivirus application) upon detecting suspicious actions of a file which are characteristic of a malicious file. A fuzzy verdict may be triggered, for example, upon detecting a file with the aid of a flexible convolution. A fuzzy verdict testifies that the file found is malicious with a certain degree of probability.

FIG. 1a shows a general block diagram of the computer attack detection system. This system is described in detail in U.S. patent application Ser. No. 15/923,581, entitled "System and method of cloud detection, investigation and elimination of targeted attacks", filed Mar. 16, 2018 and incorporated herein by reference ("the '581 application") and illustrates sources of information security events (hereafter, events). It should be noted that the illustrated system presented is just one exemplary embodiment. Therefore, a system is possible in which certain of the illustrated elements will be absent, and their functions will be realized by other elements of the system.

The information system 100 (also, the referred to as "corporate infrastructure") may include a group of computers 101 (also referred to as "computer devices"), linked together by a computer network 105. As used herein, the term "computers" 101 generally refers to any computing device and sensor, especially personal computers, notebooks, smartphones, as well as communication devices such as routers, switches, concentrators, etc. The information system 100 may be organized using any topology of the network 105 known in the prior art, such as, but not limited to: fully-connected topology, bus topology, star topology, ring topology, cellular or hybrid types. On some of the computers 101 there might be installed computer protection modules 102. The information system 100 may include a directed attack protection module 103, which may be placed, for example, on a separate server. The system may comprise a reputation server 104, which may be situated in the information system 100 or in a service provider cloud service (i.e., be connected to the detection module 110). It should be noted that the computer 101 may be either a physical device or a virtual machine. Proxy servers (not shown in the figure) may be used for connecting the computers 101 by means of the network 105 to the Internet and the detection module 110.

The computer protection module 102 and, optionally, the directed attack protection module 103 may be configured to gather information about objects on the computer 101 and in the network 105. These modules may be further configured to gather information about suspicious events which are related to said objects that occurred on the computers 101 and in the network 105. The computer protection module 102 and the directed attack protection module 103 may also be configured to send through the network 105 to the detection module 110 (for example, the cloud service of the service provider) a security notification including, in particular, information about the protection module itself (its identifier, etc.) and the information gathered about the objects. In a particular aspect, the security notification may also include a time stamp (the moment of time or the interval of time during which said information about the object was gathered). In a particular aspect, the object may be, for example, a file, a process, a URL address, an IP address, a certificate of a digital file signature or a file execution log.

The protection modules 102, 103 may be used to gather, in particular, the following information about at least one object:
the behavior of processes (such as the execution path);
events in the operating system (OS)—records in the event log of the OS;
information on interaction between networks;
indicators of compromise;
verdicts of the protection modules (including fuzzy verdicts) or test signatures;
metadata of an object, including the check sum of an object.

In another aspect, the information about the object may additionally contain, in particular, one of:
the check sum of the object or a portion thereof (for example, the check sum of a file or a portion thereof, in particular: MD5, CRC, SHA-1, SHA-2, Kessak, GOST R 34.11-2012 and others);
the source of a resource from which the object was embedded on the computer (for example, the IP address of the resource from which the object was downloaded);
the results of an emulation of the execution of the object;
the log of calls of system functions from the object (if the object is a process);
the time of appearance of the object on the computing device;
the data being transmitted by the object through the network.

The directed attack protection module 103 may be linked by the network 105 to the computer protection module 102 and may perform an analysis of the network activity of the information system 100. The directed attack protection module 103 may be also configured to perform an analysis of the detection of directed attacks in the information system by detection of objects on the computers 101, especially using a "sandbox" environment (a computer environment for the safe execution of processes) and other detection technologies (described below in conjunction with FIGS. 2 and 3).

The directed attack protection module 103 may be configured to gather information being sent in the network traffic. Thus, the directed attack protection module 103 may gather information on objects being transmitted through the network 105 from the computers 101, including those computers 101 on which no protection module 102 is installed.

Information about the objects in the network 105 may include verdicts of the directed attack protection module 103, information on suspicious behavior in the network traffic, information on suspicious behavior in the Domain Name System (DNS) traffic or the results of the emulation of objects from email or the Internet.

In a particular aspect, the protection modules 102, 103 may gather information on all of the aforementioned objects. In another aspect, the protection modules 102, 103 may contain a list of safe (legitimate) objects, for which it is known for certain that they are not malicious or suspicious, as well as a list of malicious and suspicious objects.

In yet another aspect, the protection modules 102, 103 may contain a list of supplementary objects about which information needs to be gathered. Such a list of objects may be generated by the administrator 106. In yet another particular aspect, the administrator 106 may generate a list of malicious and suspicious objects and a list of safe objects, adding or excluding objects from these lists.

The administrator 106 may indicate a list of forbidden actions and a list of allowed actions. For example, it may be forbidden in the information system 100 for some computers 101 to use the utility psexec, since this utility can be used by cyber criminals for remote administration. Information about objects associated with forbidden actions may be gathered by the protection modules 102, 103. Thus, if the use of the utility psexec has been ascertained on a particular computer 101 or in the network 105, information about the use will be sent to the detection module 110 by one of the protection modules 102, 103. In response, the detection module 110 may be configured to add the corresponding marker. The lists of forbidden and allowed actions may be stored either in the information system 100 or in the detection module 110. If the protection module 103 has detected the use of the utility psexec on a computer 101 on which no protection module 102 is installed, the checking of the allowability of use of psexec on that computer and the adding of the corresponding marker may be done either by the protection module 103 or by the detection module 110 using the list of forbidden actions. In yet another particular aspect, if there is no information present in the list of forbidden actions or the list of allowed actions, the analysis center 115 may ascertain from the administrator 106 whether the detected action is allowable and, if the action is not allowed, add the corresponding marker.

The detection module 110 may be configured to save the safety notification received in an object database 112, and then perform a search for objects from a threat database 111 in the received security notifications. Upon finding an object from the security notification in the threat database 111, the detection module 110 may add a marker to the object database 112 for the object found corresponding to it in the threat database 111. The correspondence may be defined, for example, by agreement between the check sums of the object in the threat database 111 and in the object database 112.

The marker of an object may be a characteristic of an event having occurred on the computer 101, related to the object found or an action performed by the object itself or performed on the object. Thus, the marker of an object might be added to the object if and only if a particular event has occurred on the computer 101 or a particular action related to the object has been performed. In a particular aspect, the markers of an object characterize, for example, the verdicts of the protection modules 102, 103 and information about suspicious behavior of the object (on the basis of information about the object). Thus, the marker of an object may include, in particular, the following events (hereinafter it is assumed that the marker will be added to the object only if these events related to the given object, detected on the basis of the information obtained about the object, have occurred on the computer 101):
- DNS server spoofing on a computer;
- disconnection of automatic update of the operating system;
- disconnection of the network firewall;
- disconnection of a protection modules;
- disconnection of UAC (User Account Control), a component of the Windows Operating System (OS).

In yet another particular aspect, the markers of an object which are added to the object by the detection modules 110 may additionally include the following events:
- information on lack of agreement between the check sums of an object (for example, if an executable file which may be a remote access application, has been renamed);
- violation of an authentication profile on the computer (in the course of a given period of time, during which information was gathered about an object, an authentication was performed on the computer 101 for a particular list of users, and now a user who is absent from that list has been authenticated on the computer 101);
- violation of a network activity profile of a process (in the course of a given period of time (for example, one, two or more days), during which information was gathered about an object, the process interacted through the network with a particular IP address from a list of IP addresses on the Internet, after which the process was connected through the network to an IP address which is absent from that list);
- scheduler, autoplay setting, and/or driver/OS service tasks which are unique within the given information system 100 and are absent from the list of allowed tasks;
- markers related to the results of a search for an object in external sources of cyber threat intelligence or threat intelligence;
- computers 101 on which files have been detected which are classified as a keylogger, remote admin tool or monitor, and are found on a small number of computers 101.

In a particular exemplary aspect, if an object is not contained in the list of malicious objects, the detection module 110 may calculate the fuzzy hash for it. After this, it may verify whether this fuzzy hash corresponds to any malicious objects, and if so the initial object will also be marked as malicious. Moreover, a verdict may be created by the detection module 110 for the given file and may be sent to the protection module 102.

Using the detection module 110, a search may be made for indicators of suspicious activity (i.e., characteristic indicators of computer attacks) in a suspicious activity database 113 based on the received security notification and the added markers of the object which may be contained in said security notification. Upon finding an indicator of suspicious activity, the marker contained in the suspicious activity database 113 may be added by the detection module 110, in particular to the security notification. The marker indicates the presence of the indicator of suspicious activity which has been found. Subsequently, indicators of a computer attack may be detected by identifying (also, correlating) the signature of computer attacks from a computer attack database 114 among the objects and security notifications obtained, as well as the markers of said objects and security notifications from the object database 112.

In a particular aspect, the indicators of suspicious activity may depend on the tactics, techniques and procedures (TTP) of computer attacks, and especially directed attacks.

An example of TTP is given below. A user has received an email with an attached office document. The document contained a macro, and the user consented to launching it. The macro was executed in PowerShell, which downloaded content encoded in Base 64 from a site, and launched it without creating any files on the disk. The launched code was executed in the context of the PowerShell process and set up its automatic launching in the computer system by creating a record in a branch of the register ensuring the launching of this code whenever the user logs on with their account into the OS. This code is a renamed application code. By means of this code, the cybercriminal accomplished a remote entry into the compromised system.

In this example, the following indicators of suspicious activity are present:
- the launching of PowerShell from the office application;
- the heuristic fuzzy verdict for obfuscation of the PowerShell parameters (compression, encoding in BASE64 and so on);
- the HTTP request from the PowerShell interpreter;

the site from which the attachment was downloaded was previously detected in the propagation of malicious software (contained on the list of malicious objects);

the access scanner issued a fuzzy verdict on the downloaded attachment (for example, similar to the result of working out a flexible convolution);

the reputation obtained using a reputation server is below a given value;

the protection module 102 issued a verdict or fuzzy verdict upon scanning the memory of the PowerShell process after downloading the malicious content from the site;

PowerShell modified the register keys for autoplay;

the hash for the file registered in autoplay does not match the name (for example, the hash of the file matches the hash of the application, but the file name is different).

In another aspect, the indicators of suspicious activity may depend on information about directed attacks obtained during the performance of penetration tests (abbreviated: pentest). For example, a penetration test group may use vulnerability in the Server Message Block (SMB) protocol to obtain privileged access to the computer of the administrator, where with the aid of a legal utility it created a memory dump of the process lsass.exe. Authentication data was extracted from the dump, which was then used to access other computers in the network, from which memory dumps were also obtained and authentication data was also extracted. The process was repeated several times until obtaining access to the authentication data of the administrator of the Windows domain.

As used herein, the term "an indicator of a computer attack" refers to the fulfillment of the conditions necessary to establish an information security incident (hereafter, an incident) and perform a thorough investigation and confirmation of the incident or disproving (in event of a false positive) of the directed attack by the analysis center 115.

In a particular aspect, upon identifying the signature of computer attacks it is possible to confirm unambiguously not only the identification of the indicators of a computer attack, but also confirm the identification of a computer attack without the need for confirmation by the analysis center 115, and accordingly an information security incident will be established. Then the analysis center 115 may carry out an investigation of and a response to the confirmed InfoSec incident. In another aspect, upon identifying the signature of computer attacks it might not be possible to confirm unambiguously a directed attack. In such case, the analysis center 115 may determine whether the indicator of suspicious activity is an incident or a false positive. In the event that a false positive is determined, steps may be taken to alter the signatures of the computer attacks in order to decrease such false positives in the future.

As noted above, markers might be added to both the objects and the security notifications, being a characteristic of an event having occurred on the computer 101 (the computer 101 from which the information contained in the security notification was gathered) or an action performed on the computer 101. Thus, a marker may be added to a security notification if and only if a certain event has occurred or a certain action has been performed on the computer 101, such as comes under the definition of an indicator of suspicious activity.

The markers for security notifications may include indicators of suspicious activity, such as a user performing an authentication on the computer for the first time. Below is an example of the script for the occurrence of such a suspicious event. Over the course of one month the protection module 102 gathers a list of user account records which have been successfully authenticated on the computer 101. Next, a user is authenticated on the computer 101 with an account record which is absent from the list of account records generated.

Below is an example of the script for the occurrence of a suspicious event of the remote launching of an object. The remote launching of an object may occur using the Windows Management Instrumentation (WMI) infrastructure or via OS Windows services. Other markers for security notifications that may include indicators of suspicious activity may include but are not limited to:

records have been removed from the event log;

a file has been downloaded through the network from an application which is not a browser;

files not present on white lists have been launched from suspicious directories;

shadow copies have been removed (for example, by the utility vssadmin.exe—this is characteristic of many malicious encryption applications to impede the restoration of the system);

renamed remote administration utilities have been detected (AmmyyAdmin, TeamViewer etc.);

files have been copied into the administrator's network folder (C$, ADMIN$);

bcdedit.exe utilities have been used to shut off the OS component System startup repair;

the system process lsass.exe has launched a file or modified a file on disk;

an obfuscated PowerShell script has been run;

a Windows API function has been called up;

a suspicious PowerShell command—Windows API function call—has been executed;

files from suspicious paths have been launched by the library RundII32.

In an aspect, some of the markers for objects and the markers for security notifications (and accordingly the indicators of suspicious activity) may coincide. For example, lack of correspondence between the name of an object and its check sum may be both an indicator of suspicious activity and be added as a marker to the object.

The signature of computer attacks (in a particular example, directed attacks) may include a set of the following records: a list of objects, security notifications, and markers of said objects and security notifications which are characteristic of specific computer attacks and, in particular, directed attacks. Thus, upon finding a certain combination of records from the signature of a directed attack, it may be possible to confirm the discovery of an attack (or its indicators). In one particular aspect, the signature of a computer attack may contain simultaneously at least one record about the object, at least one record about the security notification, at least one marker of the object and at least one marker of the security notification. In another aspect, the signature of a computer attack may contain only one or several of the aforementioned records—for example, a record about one object or a record about the object and the marker of the object. In yet another particular aspect, the signature of a computer attack contains at least one marker of the security notification.

In order to discover all kinds of indicators of suspicious activity (violation of the profile of network activity of a process or a computer, violation of the profile of network inputs, etc.), an unsupervised machine learning system may be used. The unsupervised machine learning system trains itself on the basis of the incoming security notifications and the affixed markers. After training, the machine learning system is capable of assigning markers to security notifications not having a marker in the suspicious activity database 113. Moreover, a supervised machine learning system may be used to solve the problem of classification of the behavior of a process or a computer. In the case of the supervised machine learning system, the factors are indicators of suspicious activity and the training is done with data for known detected computer attacks.

The object database 112 may be configured to store the security notifications containing information about the objects, and also store the markers added to the objects and the markers added to the security notifications.

The threat database 111 may be configured to contain data on known threats. In particular, the threat database 111 may contain identifiers and information about objects which are indicators of threats. Each object in the threat database 111 may be labeled with a corresponding marker. For example, malicious objects may correspond to the marker "malicious object". If an object was used in a specific directed attack, it will be assigned a corresponding marker.

The known directed attack "Turla" is considered as an example. There are known URL addresses related to this attack. If an executable file has accessed one of said URL addresses, that executable file will have a marker added to it, indicating the relation to a directed attack. For example, the marker "access to URL address related to APT Turla".

In another example, the directed attack "Naikon APT" is related to a known set of IP addresses, and if an object has accessed said address, a marker will be added to the object "access to IP address related to Naikon APT".

The suspicious activity database 113 may contain a list of indicators of suspicious activity. Each indicator of suspicious activity may be labeled with a special marker, indicating the directed attack with which that indicator of suspicious activity is connected (examples of indicators of suspicious activity have been given above).

In a particular aspect, if the object is labeled with a particular set of markers, an additional marker indicating this feature may be added to that object. Thus, a set of markers may also be labeled with a marker.

A computer attack database 114 may be configured to contain a list of signatures of computer attacks or directed attacks.

Figure 1B:
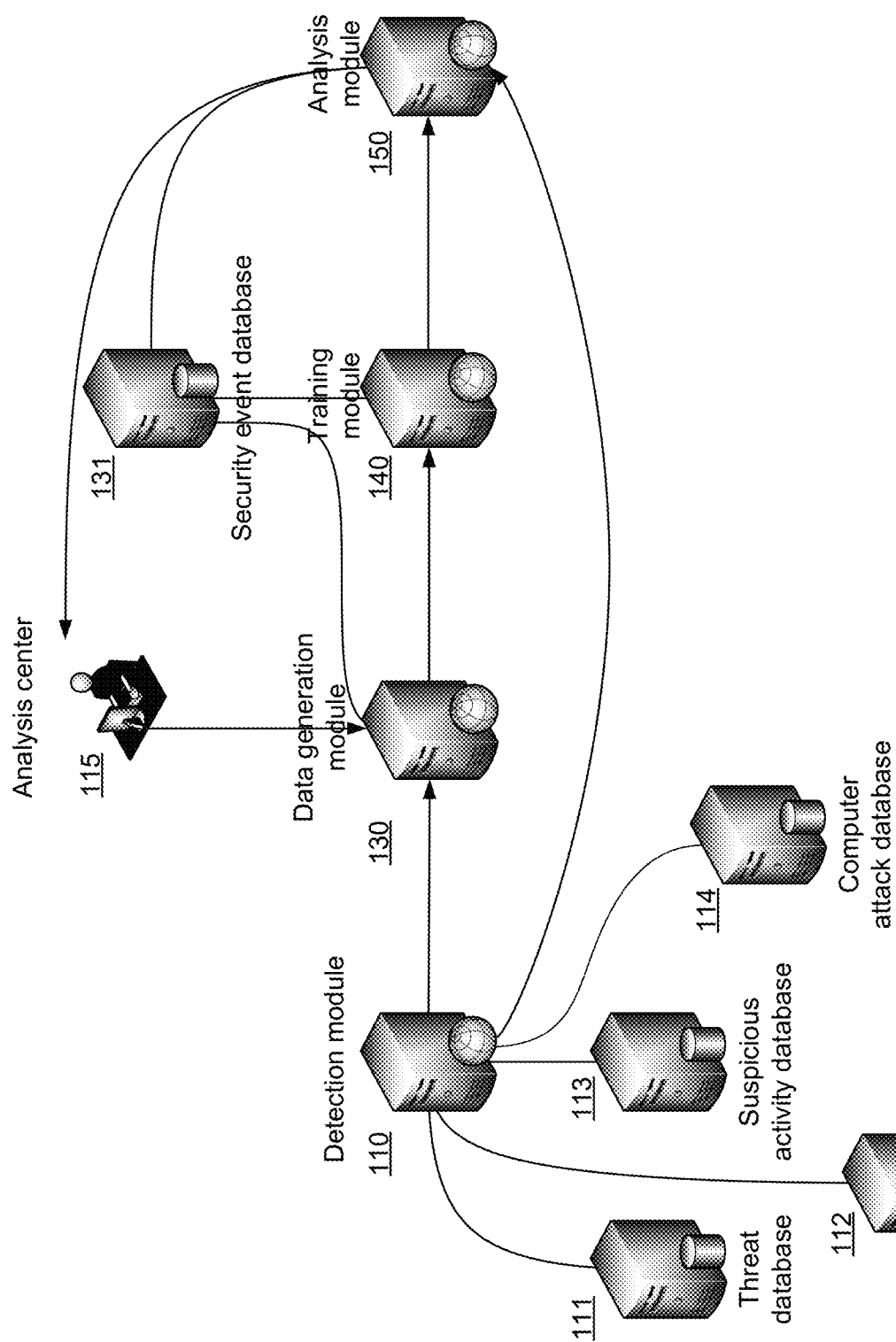
FIG. 1b shows a block diagram of exemplary systems for processing of information security events.

FIG. 1b shows a block diagram of systems for processing of information security events.

The data generation module 130 may be configured to generate a training sample and a test sample by including in each sample known information security events (hereinafter, events) and verdicts corresponding to each event. The information security events may be various events related to a possible violation of the information security of the system 100. The events may contain at least one security notification received from the protection module 102. In a particular aspect, the security notifications may be received from one of: a computer protection module 102, a directed attack protection module 103, an intrusion detection system and a SIEM system. Other particular exemplary aspects of the security notifications have been described above in FIG. 1a and are applicable to the system presented in FIG. 1b.

The verdict of each event may indicate an "information security incident" (hereinafter, an "incident") or a "false positive". That is, a training sample may be generated using labeled data on events and verdicts associated with those events by the analysis center 115. The data generation module 130 may keep the training sample in a security event database 131. The training module 140 may be connected to the data generation module 130 and to the security event database 131. The training module 140 may be configured to train the machine learning model to determine the probability of a false positive of an event using the data of the training sample from the security event database 131.

An analysis module 150 may be connected to the training module 140 and to the security event database 131. The analysis module 150 may receive events for which a verdict is not known, and it may be configured to determine verdicts for the received events by using a trained machine learning model to determine the probability of a false positive. The events may be obtained in a given interval of time or in a given data packet. The analysis module 150 may be configured to assign a verdict of "false positive" if the probability of a false positive for the corresponding event is greater than a given first threshold, or else the analysis module 150 may assign a verdict of "incident". It should be noted that, in one aspect, the verdict determined by the analysis module 150 may be tentative. And the final verdict may be assigned (confirming or rejecting the verdict assigned by the analysis module 150) at the analysis center 115. The threshold of the model is a number having values ranging from 0 to 1.

In a particular aspect, the training module 140 may assign the value of the first threshold as follows: the first threshold is equal to a number for which the value of the quality metric of the machine learning model using the test sample reaches a maximum value, where the first threshold is a number indicating a verdict of "false positive" when the probability of a false positive is greater than this threshold, and otherwise indicating a verdict of "incident". The quality metric of the model may include but is not limited to one of: completeness of classification (recall), and the Receiver Operating Characteristic (ROC)-Area Under Curve (AUC) indicator. The analysis module 150 may then change the verdict of "false positive" for a certain number of events (hereinafter: the first set of events) to a verdict of "incident". In a particular aspect, the first set of events may be chosen at random among the events whose verdict indicates a "false positive", so that the number of events of the first set is not greater than a second threshold, which is the parameter of the machine learning model. After this, the analysis module 150 may send on for analysis at the analysis center 115 the events whose verdict indicates an "incident".

In one aspect, the training module 140 may assign the second threshold, which is dependent on the results of the analysis performed on the events of the first set. The results of the analysis may contain verdicts assigned for the events being analyzed.

In another aspect, the value of the second threshold may additionally be determined as follows: the results of the analysis of the events of the first set are obtained, and then a second set of events is determined. The second set of events may consist of those events of the first set for which a verdict of "incident" was confirmed according to the results of the analysis. As a result, the second threshold may be changed if the ratio of the number of events of the second set to the number of events of the first set is greater than a given third threshold. For example, the number of events of the first set is 100, while the number of events of the second set proved to be 15 according to the results of the analysis. If the third threshold is equal to 0.1, then the ratio 15/100 is greater than the third threshold, and so the second threshold will be changed (for example, increased by 10%).

In another aspect, the second threshold may be changed depending on the probability of a false positive of the events of the second set. For example, if the events of the second set have a very high probability of a false positive, the second threshold may be lowered in order to include in the second set additional events with a low value of the probability of a false positive.

In another aspect, if the second threshold is greater than a given fourth threshold, the verdict for events determined as being a false positive and not falling within the first set of events may be changed to "incident". This aspect makes it possible to reduce errors of the second kind in event of retraining of the machine learning model, that is, when a verdict of "false positive" has been assigned for a large number of events, whereas in reality the verdict for these events should be "incident". Thus, advantageously, the remaining events whose verdict indicates a false positive will not be sent on for analysis. Moreover, the verdict will not be changed to "incident" for these events.

In a particular aspect, an interval of time may be specified (the time during which events are received) which is equal to the time elapsed since the moment of sending on the previous events for analysis (for example, a day). In another aspect, an arbitrary interval of time may be specified. In another aspect, the interval of time may be specified so as to reduce the workload of the analysis center 115, without lowering the quality of the model. That is, the interval of time may be increased by a value at which the quality of the model will remain constant. Therefore, in another aspect, if the second threshold is greater than a predefined fourth threshold, the verdict for events determined as being a false positive during the given interval of time and not falling within the first set of events may be changed to "incident". In another aspect, the events may be obtained in real time.

In one particular aspect, the data generation module 130 may additionally include in the training sample and the test samples new events and verdicts determined for these new events according to the results of analysis by the analysis center 115. That is, the analysis results will be added to the training sample and the test samples for training the machine learning model that will be used in future for analysis of the new events.

In a particular aspect, a given number of events determined as being a false positive may be determined according to the probability of a false positive for these events.

In a particular aspect, the training module 140 may use one of the following machine learning models: logistical regression, neural net, decision making tree, and random forest.

In a particular aspect, the following features of the machine learning model may be used including, but not limited to:
a) the sources of the event security notifications;
b) the characteristics of the source of the event security notification;
c) the characteristics of the event security notifications.

In another aspect, the features of the machine learning model may be the parameters of events which are unified according to the sources of those events. The features of the machine learning model are any input values sent to the model.

As mentioned above, the sources of the security notifications of the events may include, but are not limited to the detection module 110, the protection module 102, the directed attack protection module 103, and also any other security system, such as a SIEM system, an IDS/IPS system, and the like. In a given example, the characteristics of the source of the security notification of an event may be the characteristics of the protection module 102, such as the version of the protection modules, the version of the antivirus databases, and so forth. Different events may be assigned a different unique identifier. The characteristics of the objects of an event may depend on the events and the objects contained in the events. For example, an event is the following feature of suspicious activity: for a file registered in autoplay, the hash does not match the name (for example, the file hash corresponds to the hash of the TeamViewer application, while the file name is different). In this example, the event object is a file. Accordingly, the characteristics of the event object are the characteristics of the file, such as the file hash and other file meta-data for example.

One non-limiting example of the functionality of the disclosed system is now discussed. The administrator 106 may establish a filtering fraction. The filtering fraction is the fraction of events which will be determined to be a false positive depending on the probability of a false positive. The choice of the value of the filtering fraction may depend on the average number of events occurring in the information system 100 in a given interval of time, or the workload of the analysis center 115. The smaller the filtering fraction, the fewer number of false positives, but the greater the workload of the analysis center 115.

For example, the filtering fraction may be set at 30%. Accordingly, 70% of events with a lower value of the probability of a false positive will be determined as being "incidents". The probability of a false positive is calculated by the analysis module 150 using the machine learning model based on the training sample. The first threshold may be chosen using the values found for the probability of a false positive for the events obtained in the given interval of time. The first threshold may be chosen to be equal to the ratio of the filtering fraction to the second threshold.

If the second threshold is equal to 15%, then the first threshold is calculated by the formula 30%/(100%-15%) and is equal to 35.3%. Consequently, in this example, the 35.3% of the events with the largest value of the probability of a false positive will be determined as being a false positive. The remaining 64.7% of the events will be given a verdict of "incident" and will be sent on for analysis. Of the events determined as being a false positive, the verdict will be changed to "incident" for 15% of the events, and these events also will be sent on for analysis. The 15% of events may be chosen at random, for example, according to a uniform distribution law.

As a result, 70% of the events will be sent on for analysis, and 30% of the events will be determined as being a false positive.

Figure 2:
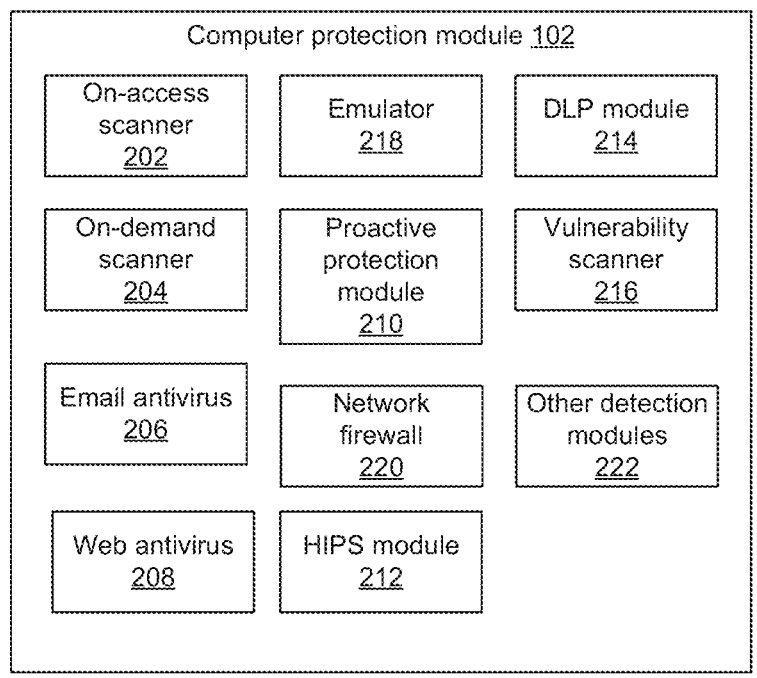
FIG. 2 shows an exemplary computer protection system.

FIG. 2 shows an exemplary computer protection system. The computer protection module 102 may contain modules designed to ensure the security of a computer 101: an on-access scanner 202, an on-demand scanner 204, an email antivirus 206, a web antivirus 208, a proactive protection module 210, a HIPS (Host Intrusion Prevention System) module 212, a DLP (data loss prevention) module 214, a vulnerability scanner 216, an emulator 218, a network firewall 220, and others 222. In a particular aspect, these modules may be part of the protection module 102. In another aspect, these modules may be implemented as separate software components.

The on-access scanner 202 may be configured to detect malicious activity of all files being opened, run, or saved on the computer system of the user. The on-demand scanner 204 differs from the access scanner 202 in that it scans files and directories specified by the user on the demand of the user.

The email antivirus 206 may be configured to check incoming and outgoing emails for malicious objects. The web antivirus 208 may be configured to prevent the execution of malicious code which might be contained on web sites when visited by the user, and also to block the opening of web sites. The HIPS module 212 may be configured to detect undesirable and malicious activity of programs and to block this activity at the time of execution. The DLP module 214 may be configured to detect and prevent leakage of confidential data from a computer or network. The vulnerability scanner 216 may be configured to detect vulnerabilities on the computer 101 (for example, determining that certain components of the protection module 102 have been shut off, outdated virus databases, network port closed, etc.). The network firewall 220 may be configured to control and filter network traffic in accordance with specified rules. The functionality of the emulator 218 may include simulating a guest system during the execution of code in the emulator 218. The proactive protection module 210 may use behavioral signatures to detect the behavior of executable files and classify them according to their level of trust.

The indicated modules, upon detecting malicious software (suspicious behavior, spam and other indicators of a computer threat), may create a corresponding security notification (which may afterwards be transformed into a verdict of the protection module 102). The generated security notifications inform the protection modules of a discovered threat and the need to perform actions to remove the threat (for example, deletion or alteration of a file, forbidding execution, etc.). In a particular aspect, the module which discovered malicious software may itself perform actions for removal of the threat. In another example, the verdict of the protection module 102 may be fuzzy or tentative (since the verdict may give false positives). In this case, the protection modules will not perform actions for removal of the threat, but will pass on the notification to the detection module 110. It should be noted that the verdict of the protection module 102 may be part of the information about an object (file, process) which will then be sent to the detection module 110 in the form of a security notification.

Figure 3:
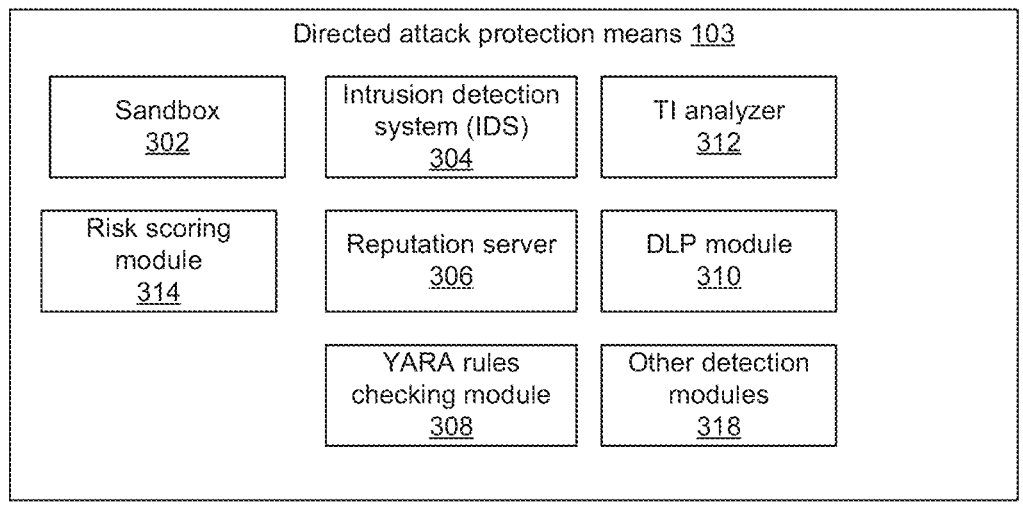
FIG. 3 shows an exemplary directed attack protection system.

FIG. 3 shows an exemplary directed attack protection system. The directed attack protection module 103 may contain, for example, the following protection modules: a "sandbox" module 302, an Intrusion Detection System (IDS) 304, a reputation service module 306, a YARA rules checking module 308, a DLP module 310, TI (threat intelligence) analyzer 312, scoring module 314 and other detection modules 316.

The "sandbox" module 302 may have a functionality similar to that of the emulator 218 of the computer protection module 102 except that the sandbox module 302 can use additional computing capabilities and work for a longer time, since the directed attack protection module 103 has no time limits such as are inherent in the computer protection module 102.

The sandbox environment 302 may be a computer environment for safe execution of processes and it may be configured to determine suspicious activity during the execution of a process launched from a file.

The sandbox environment 302 may be implemented, for example, in the form of a virtual machine, based on a partial virtualization of the file system and registry, based on rules of access to the file system and registry, or based on a hybrid approach.

The intrusion detection system 304 may be configured to identify instances of unauthorized access to a computer 101 or network 105 or unauthorized control thereof.

The reputation server 306 may be a mirror or cached copy of the reputation server 104 and furthermore may contain information on the popularity of objects on the computers 101 (the number of computers 101 on which an object is present, the number of times the object is launched, etc.).

The YARA rules checking module 308 may be configured to check the YARA signatures—an open format of signatures.

The DLP module 310 may be configured to detect and prevent leakage of confidential data outside the computer or network.

A TI (threat intelligence) analyzer 312 may be a module configured to match up objects from reports on computer attacks and information about the objects and indicators of suspicious behavior. For example, the TI analyzer 312 may determine a list of IP addresses of command centers participating in known computer attacks. The TI analyzer 312 may send the obtained information to a scoring module 314, which may be configured to rank the information about the objects and the features of suspicious behavior according to the probability of their belonging to a computer attack.

Figure 4:
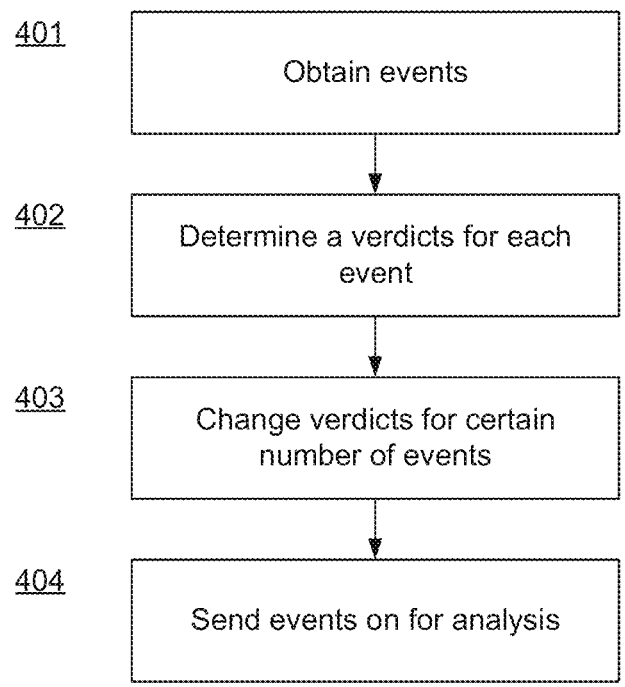
FIG. 4 illustrates an exemplary method of processing of information security events prior to sending them on for analysis.

FIG. 4 illustrates a method of processing of information security events prior to sending them on for analysis. The method may be implemented by an analysis module 150 residing on a server.

At step 401, the analysis module 150 may obtain information related to a plurality of information security events occurred in the computer system. Each of the plurality of information security events includes an event related to a possible violation of information security of the computer system.

At step 402, the analysis module 150 may determine a verdict is for each event, using a trained machine learning model to determine the probability of a false positive. The verdict indicates whether the corresponding information security event is harmful or harmless to the information security of the computer system. In an aspect, the verdict includes one of the following: "information security incident" or "false positive." The analysis module 150 may determine a verdict to be "false positive" if the probability of a false positive for the corresponding event is greater than a given first threshold. Otherwise the analysis module 150 may determine a verdict to be "information security event" (hereafter, an "incident" verdict).

At step 403, the analysis module 150 may change the verdict of "false positive" for a first set of events to the "incident" verdict. In a particular aspect, the first set of events may be chosen at random among the events whose verdict indicates a "false positive", so that the number of events of the first set is not greater than a second threshold, which is the parameter of the machine learning model.

Finally, at step 404, the analysis module 150 may send events with the "incident" verdict for analysis to the analysis center 115. Thus, the processing of the events by the analysis module 150 consists of a classification of the events and also of changing of the verdicts for a certain number of the events.

In a particular aspect, a first threshold may be assigned so as to raise the metric of quality of the machine learning model. In another aspect, the first set of events may be randomly chosen among the events whose verdict indicates a "false positive" so that the number of events of the first set is not greater than a second threshold.

In another aspect, the second threshold may be assigned based on the results of a previously performed analysis of the events of the first set. In another aspect, in addition:

a) results may be obtained from the analysis of the events of the first set;

b) a second set of events may be determined, consisting of those events of the first set for which an "incident" verdict was confirmed based on the results of the analysis;

c) the second threshold may be changed if the ratio of the number of events of the second set to the number of events of the first set is greater than a given third threshold.

In one aspect, the second threshold may be changed depending on the probability of a false positive for events of the second set. In another aspect, if the second threshold is greater than a given fourth threshold, the verdict may be changed to "incident" for events determined to be false positives and not falling within the first set of events.

In another aspect, the analysis module 150 may send on to the analysis center 115 for analysis the events with the lowest probability of a false positive. The number of such events should not be greater than a given fifth threshold. The fifth threshold may be assigned by the analysis center 115. This fifth threshold may depend, for example, on the workload of the analysis center 115. Thus, if the analysis center 115 is experiencing an elevated workload and is not able to analyze all the events being sent by the analysis module 150, only the events with the lowest probability of a false positive will be sent to it. That is, in this case, the analysis module 150 may send only the highest priority events, which are "incidents" with the highest probability. In another aspect, the fifth threshold may be changed according to the time during which the analysis is performed (e.g., being inversely proportional to it). Thus, if the time for analysis of the events is increased, the fifth threshold is lowered in order to decrease the number of events being sent on for analysis. But if the analysis time decreases, the fifth threshold is increased. Thus, the incident response time is shortened.

Thus, the desired technical results will be achieved by aspects of the present invention, namely, a decreased number of events being sent on for analysis, as well as a decreased number of false positives, by employing the trained machine learning model to determine the probability of a false positive. Furthermore, the stated technical problem will be solved.

The particular exemplary aspects previously disclosed for the system according to FIG. 1a and FIG. 1b are also applicable to the method described by FIG. 4.

Figure 5:
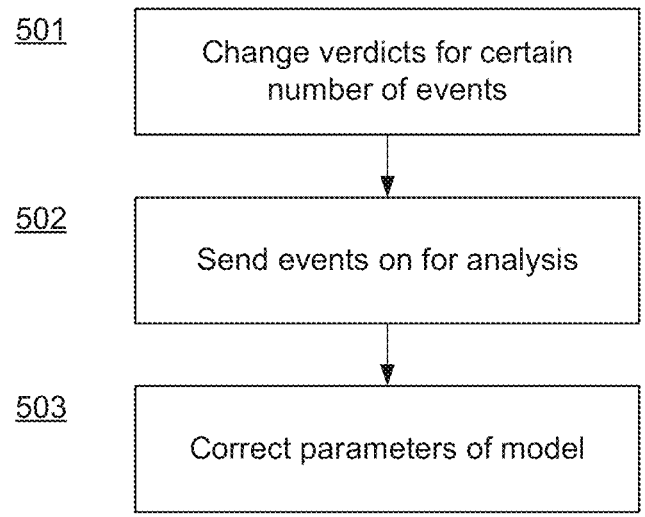
FIG. 5 illustrates an exemplary method of correcting the parameters of a machine learning model for determining false positives and/or information security incidents.

FIG. 5 illustrates a method of correcting the parameters of a machine learning model for determining false positives and/or information security incidents. The method illustrated in FIG. 5 may be implemented on a server by the analysis module 150.

At step 501, the analysis module 150 may change verdicts for a certain number (the first set) of events having a verdict of "false positive" to a verdict of "incident". The verdicts for the events are determined using a machine learning model to determine false positives and/or incidents. Next, at step 502, the events from the first set are sent on for analysis to the analysis center 115 by the analysis module 150. Finally, at step 503, the analysis module 150 may use the results of the analysis obtained from the analysis center 115, to correct the machine learning parameters for determining false positives and/or incidents. It should be noted that steps 501-503 may be carried out in parallel by the analysis module 150. For example, at step 501 the verdicts for the events may be changed as new events are received. In parallel, at step 502, those events for which the verdict was changed will be sent on for analysis by the analysis module 150. Moreover, the analysis module 150 may perform step 503 as the results of the analysis of the events are received.

In a particular aspect, the machine learning model may determine a verdict of "false positive" and/or a verdict of "incident" by determining for each event the probability of a false positive and comparing that probability of a false positive with a given first threshold. The first threshold may be a parameter of the machine learning model, where the event receives a verdict of "false positive" if the probability of a false positive of the event is greater than the first threshold, and otherwise it receives a verdict of "incident".

In another aspect, the first set of events may be chosen at random from among the events whose verdict indicates a "false positive", so that the number of events of the first set is not greater than a second threshold. The second threshold may also be a parameter of the machine learning model.

In another aspect, a training sample and a test sample may be generated by including in each sample known events and verdicts corresponding to the events, the verdict of each event indicating an "incident" or a "false positive". The training module 140 may train the machine learning model using the training sample. In another aspect, the value of the first threshold may be assigned to be equal to the number for which the value of the quality metric of the machine learning model using the test sample reaches a maximum value. The training module 140 may search for such a value of the first threshold using methods of optimization problem solving known in the art, such as gradient descent and other methods. The first threshold may be a number indicating a verdict of "false positive" when the probability of a false positive is greater than the first threshold, and otherwise indicating a verdict of "incident". The quality metric may include but is not limited to the completeness of classification and/or the ROC-AUC indicator.

In another aspect, the value of the second threshold may be determined by the training module 140 using the following steps:

a) a second set of events may be determined that may consist of those events of the first set for which an "incident" verdict was confirmed according to the results of the analysis;

b) the second threshold may be changed if the ratio of the number of events of the second set to the number of events of the first set is greater than a given third threshold.

In one aspect, the first threshold may be chosen equal to the ratio between a filtering fraction and the second threshold, where the filtering fraction is assigned by the administrator 106 or the analysis center 115. As noted above, the filtering fraction may be the fraction of events that will be determined as being a false positive depending on the probability of a false positive. In another aspect, each event may contain at least one security notification received from the protection module 102 installed on the computer device of the user. The particular aspects previously described in FIG. 1a and FIG. 1b and in FIG. 4 may be also applicable to the method described by FIG. 5.

Figure 6:
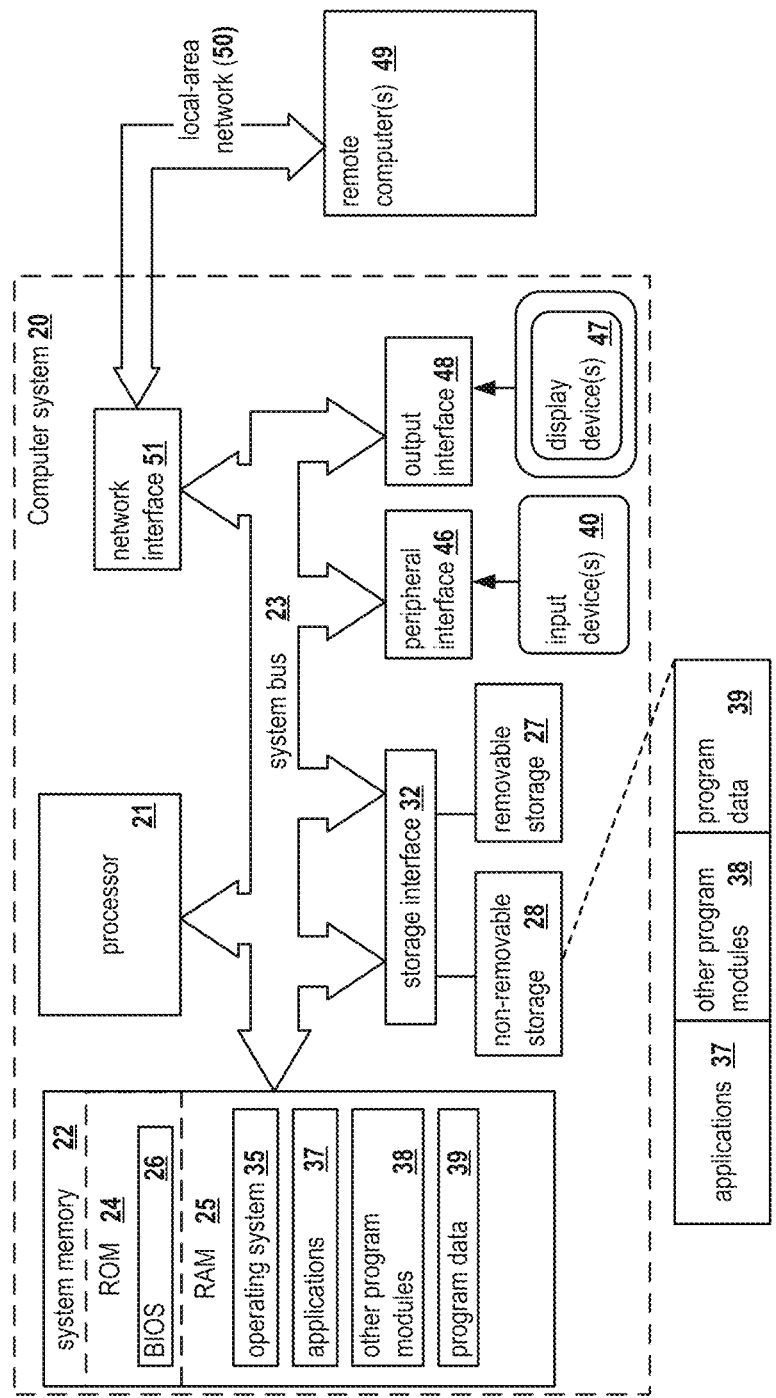
FIG. 6 shows an example of a general-purpose computer system on which variant aspects of systems and methods disclosed herein may be implemented.

FIG. 6 is a block diagram illustrating a computer system 20 on which aspects of systems and methods for processing information security events to detect cyberattacks may be implemented. The computer system 20 may represent an attack protection system of FIG. 3 and/or FIG. 4 and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for processing information security events to detect cyberattacks on a computer system, the method comprising:
 receiving information related to a plurality of information security events occurred in the computer system, wherein each of the plurality of information security events comprises an event related to a possible violation of information security of the computer system;
 determining a verdict for each of the plurality of the received information security events, wherein the verdict comprises: i) information security incident or ii) false positive and wherein the verdict is false positive if the probability of a false positive for the corresponding information security event is greater than a first threshold;
 changing verdicts for a subset of the plurality of information security events from the false positive to the information security incident, wherein the subset of the plurality of information security events whose verdicts are to be changed are selected at random from among the information security events whose verdicts are determined as being false positive, and wherein a number of information security events in the subset is lower than a second threshold; and
 performing analysis of the information security events having a verdict of the information security incident to determine if the computer system is under a cyberattack.

2. The method of claim 1, wherein receiving information related to the plurality of information security events further comprises receiving one or more event security notifications related to an object of the computer system and wherein the one or more event security notifications include a marker characterizing an event that occurred in the computer system and a timestamp indicating time interval during which corresponding information about the event was gathered, and wherein the first threshold is related to a quality metric of the trained machine learning model.

3. The method of claim 2, wherein the verdict is determined using a trained machine learning model based on at least one of the following: characteristics of the one or more event security notifications, one or more sources of the one or more event security notifications, characteristics of the one or more sources of the one or more event security notifications.

4. The method of claim 1, wherein performing the analysis of the information security events further comprises performing the analysis of the information security events having a lowest probability of a false positive.

5. The method of claim 1, wherein the verdict comprises one of: a fuzzy verdict, a tentative verdict, a final verdict.

6. The method of claim 2, wherein the marker characterizing an event that occurred in the computer system includes at least one of the following: a checksum of at least a portion of the object, a source of a resource from which the object was embedded on the computer system, results of an emulation of the execution of the object, a log of calls of system functions from the object, time of appearance of the object on the computer system, data being transmitted by the object through a computer network.

7. The method of claim 1, wherein determining the verdict further comprises calculating hash for a corresponding object and determining if the calculated hash corresponds to a known malicious object.

8. The method of claim 3, further comprising determining the second threshold based on the results of the analysis performed on the first set of the information security events.

9. The method of claim 8, further comprising modifying a training sample of the trained machine learning model based on the results of the analysis performed on the first set of information security events.

10. A system for processing information security events to detect cyberattacks on a computer system, the system comprising:
a hardware processor configured to:
receive information related to a plurality of information security events occurred in the computer system, wherein each of the plurality of information security events comprises an event related to a possible violation of information security of the computer system;
determine a verdict for each of the plurality of the received information security events, wherein the verdict comprises: i) information security incident or ii) false positive and wherein the verdict is false positive if the probability of a false positive for the corresponding information security event is greater than a first threshold;
change verdicts for a subset of the plurality of information security events from the false positive to the information security incident, wherein the subset of the plurality of information security events whose verdicts are to be changed are selected at random from among the information security events whose verdicts are determined as being false positive, and wherein a number of information security events in the subset is lower than a second threshold; and
perform analysis of the information security events having a verdict of the information security incident to determine if the computer system is under a cyberattack.

11. The system of claim 10, wherein the hardware processor configured to receive information related to the plurality of information security events is further configured to receive one or more event security notifications related to an object of the computer system and wherein the one or more event security notifications include a marker characterizing an event that occurred in the computer system and a timestamp indicating time interval during which corresponding information about the event was gathered and wherein the first threshold is related to a quality metric of the trained machine learning model.

12. The system of claim 11, wherein the verdict is determined using a trained machine learning model based on at least one of the following: characteristics of the one or more event security notifications, one or more sources of the one or more event security notifications, characteristics of the one or more sources of the one or more event security notifications.

13. The system of claim 10, wherein the hardware processor configured to perform the analysis of the information security events is further configured to perform the analysis of the information security events having a lowest probability of a false positive.

14. The system of claim 10, wherein the verdict comprises one of: a fuzzy verdict, a tentative verdict, a final verdict.

15. The system of claim 11, wherein the marker characterizing an event that occurred in the computer system includes at least one of the following: a checksum of at least a portion of the object, a source of a resource from which the object was embedded on the computer system, results of an emulation of the execution of the object, a log of calls of system functions from the object, time of appearance of the object on the computer system, data being transmitted by the object through a computer network.

16. The system of claim 10, wherein the hardware processor configured to determine the verdict is further configured to calculate fuzzy hash for a corresponding object and to determine if the calculated hash corresponds to a known malicious object.

17. The system of claim 12, wherein the hardware processor is further configured to determine the second threshold based on the results of the analysis performed on the first set of the information security events.

18. The system of claim 17, wherein the hardware processor is further configured to modify a training sample of the trained machine learning model based on the results of the analysis performed on the first set of information security events.

19. A non-transitory computer readable medium storing thereon computer executable instructions processing information security events to detect cyberattacks on a computer system, including instructions for:
receiving information related to a plurality of information security events occurred in the computer system, wherein each of the plurality of information security events comprises an event related to a possible violation of information security of the computer system;
determining a verdict for each of the plurality of the received information security events, wherein the verdict comprises: i) information security incident or ii) false positive and wherein the verdict is false positive if the probability of a false positive for the corresponding information security event is greater than a first threshold;
changing verdicts for a subset of the plurality of information security events from the false positive to the information security incident, wherein the subset of the plurality of information security events whose verdicts are to be changed are selected at random from among the information security events whose verdicts are determined as being false positive, and wherein a number of information security events in the subset is lower than a second threshold; and
performing analysis of the information security events having a verdict of the information security incident to determine if the computer system is under a cyberattack.

20. The non-transitory computer readable medium of claim 19, wherein the instructions for receiving information related to the plurality of information security events further comprise instructions for receiving one or more event security notifications related to an object of the computer system and wherein the one or more event security notifications include a marker characterizing an event that occurred in the computer system and a timestamp indicating time interval during which corresponding information about the event was gathered and wherein the first threshold is related to a quality metric of the trained machine learning model.

* * * * *